United States Patent [19]
Nelson et al.

[11] Patent Number: 5,215,653
[45] Date of Patent: Jun. 1, 1993

[54] CATALYST INVENTORY CONTROL IN AN EBULLATED BED PROCESS

[75] Inventors: Gerald V. Nelson, Nederland; Govanon Nongbri, Port Neches, both of Tex.

[73] Assignee: Texaco Inc., White Plains, N.Y.

[21] Appl. No.: 857,143

[22] Filed: Mar. 25, 1992

[51] Int. Cl.⁵ .................... C10B 31/02; C10B 31/12
[52] U.S. Cl. .................... 208/152; 208/106; 208/107; 208/DIG. 1; 208/146; 208/157; 208/166; 208/142; 208/150; 208/59; 422/211; 422/216; 422/219
[58] Field of Search ............... 208/DIG. 1, 146, 157, 208/166, 150, 152, 154, 157; 422/211, 216, 219

[56] References Cited

U.S. PATENT DOCUMENTS

| | | | |
|---|---|---|---|
| 3,363,992 | 1/1968 | Chervenak | 23/288 |
| 3,398,085 | 8/1968 | Engle | 208/157 |
| 3,410,791 | 11/1968 | Perry et al. | 208/143 |
| 3,412,010 | 11/1968 | Alpent et al. | 208/112 |
| 3,523,858 | 8/1970 | Stewart et al. | 208/157 |
| 3,557,019 | 1/1971 | Van Driesen | 252/416 |
| 4,673,552 | 6/1987 | Li et al. | 422/140 |
| 4,684,456 | 8/1987 | Van Priesen et al. | 208/143 |
| 4,750,989 | 6/1988 | Soderborg | 208/143 |
| 4,902,407 | 2/1990 | Chan et al. | 208/157 |

*Primary Examiner*—Helane Myers
*Attorney, Agent, or Firm*—James L. Bailey; Jack H. Park; Richard A. Morgan

[57] ABSTRACT

An improved method of controlling catalyst inventory in the reactor of an ebullated bed process has been discovered. Pressure differentials are measured to calculate a catalyst inventory characterization factor. This factor is calculated by means of a new algorithm. Aged catalyst is withdrawn and fresh catalyst added in an amount to reestablish the value of the factor. The catalyst to oil ratio is maintained despite changes in bed ebullation, gas and liquid holdups, oil residence time and conversion.

8 Claims, 1 Drawing Sheet

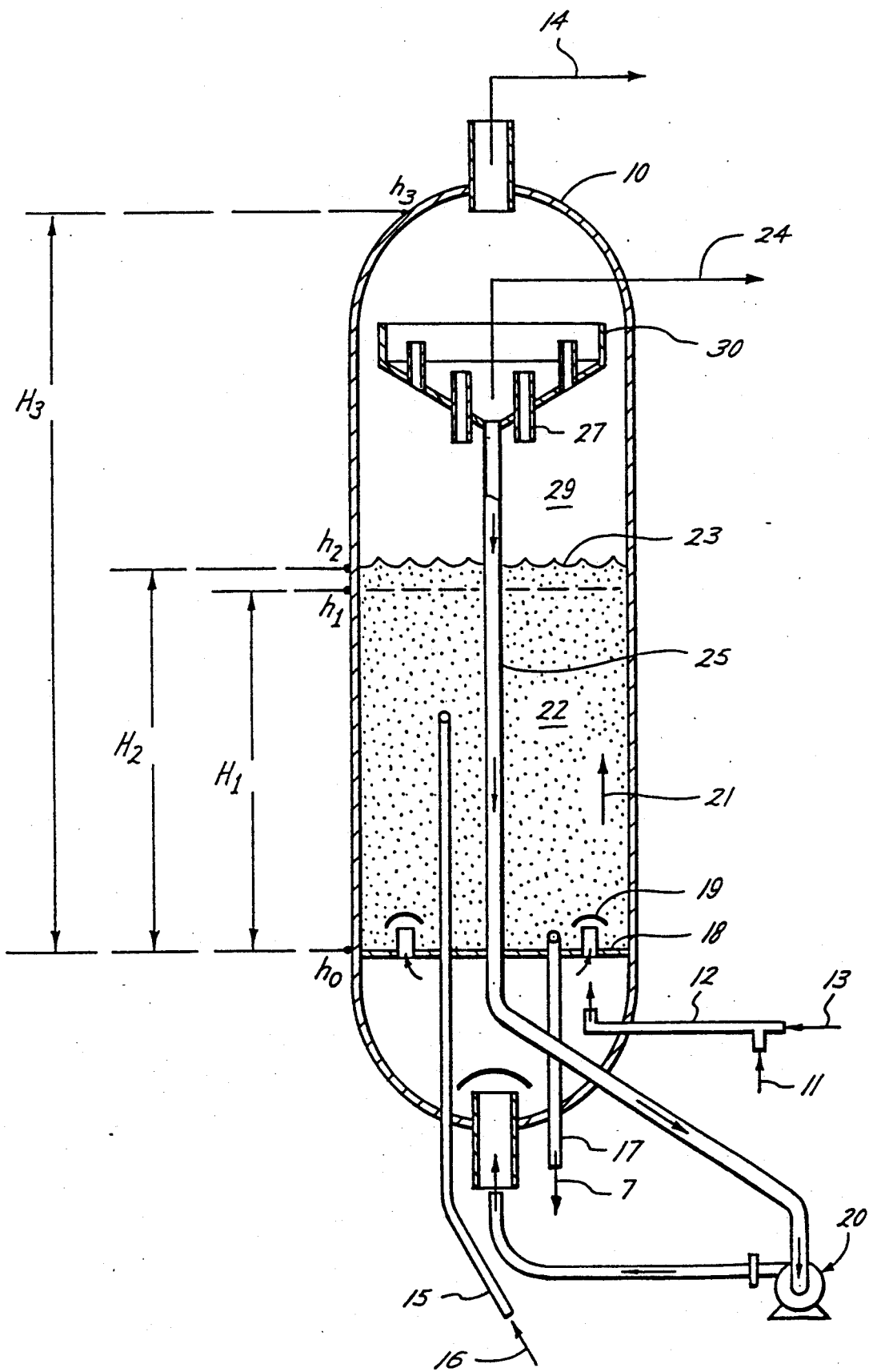

CATALYST INVENTORY CONTROL IN AN EBULLATED BED PROCESS

BACKGROUND OF THE INVENTION

1. Field of the Invention

The invention relates to an improved method of controlling catalyst inventory in the reactor of an ebullated bed process. A catalyst inventory characterization factor is calculated which is used to adjust catalyst addition to the reactor. Improvements of this nature have been classified in U.S. Class 208/152.

2. Description of Other Relevant Methods in the Field

The ebullated bed process comprises the passing of concurrently flowing streams of liquids, or slurries of liquids and solids, and gas through a vertically cylindrical vessel containing catalyst. The catalyst is placed in random motion in the liquid and has a gross volume dispersed through the liquid medium greater than the volume of the mass when stationary. This technology has found commercial application in the upgrading of heavy liquid hydrocarbons or converting coal to synthetic oils.

The process is generally described in U.S. Pat. No. 25,770 to Johanson incorporated herein by reference. A mixture of hydrocarbon liquid and hydrogen is passed upwardly through a bed of catalyst particles at a rate such that the particles are forced into random motion as the liquid and gas pass upwardly through the bed. The catalyst bed motion is controlled by a recycle liquid flow so that at steady state, the bulk of the catalyst does not rise above a definable level in the reactor. Vapors along with the liquid which is being hydrogenated pass through that upper level of catalyst particles into a substantially catalyst free zone and are removed at the upper portion of the reactor.

In an ebullated bed process the substantial amounts of hydrogen gas and light hydrocarbon vapors present rise through the reaction zone into the catalyst free zone. Liquid is both recycled to the bottom of the reactor and removed from the reactor as product from this catalyst free zone. Vapor is separated from the liquid recycle stream before being passed through the recycle conduit to the recycle pump suction. The recycle pump (ebullation pump) maintains the expansion (ebullation) and random motion of catalyst particles at a constant and stable level. Gas or vapor present in the recycled liquid materially decreases the capacity of the recycle pump as well as alters the flow pattern within the reactor and thus decreases stability of the ebullated bed.

Reactors employed in a catalytic hydrogenation process with an ebullated bed of catalyst particles are designed with a central vertical recycle conduit which serves as the downcomer for recycling liquid from the catalyst free zone above the ebullated catalyst bed to the suction of a recycle pump to recirculate the liquid through the catalytic reaction zone. The recycling of liquid from the upper portion of the reactor serves to ebullate the catalyst bed, maintain temperature uniformity through the reactor and stabilize the catalyst bed.

U.S. Pat. No. 4,684,456 to R. P. Van Driesen et al. teaches the control of catalyst bed expansion in an expanded bed reactor. In the process, the expansion of the bed is controlled by changing the reactor recycle pump speed. The bed is provided with high and low level bed detectors and an additional detector for determining abnormally high bed (interface) level. The interface level is detected by means of a density detector comprising a radiation source at an interior point within the reactor and a detection source in the reactor wall. Raising and lowering the bed level changes the density between the radiation source and the radiation detector. It is apparent from the patent that the vertical range of steady state bed (interface) level as well as the highest and lowest steady state interface level is a design parameter.

U.S. Pat. No. 4,673,552 to A. S. Li et al. teaches a downwardly directed fluid flow distributor for recycle liquid in an ebullated bed reactor. The figures show the plenum 12 below the distributor grid 18 of reactor 14 contains inlet conduit 10, central conduit 24 and sparger ring 40. Ebullated catalyst bed 20 is supported on distribution grid 18 by a combination of recycle liquid and liquid and gas feed through tubes 26 and caps 28.

U.S. Pat. Nos. 3,410,791 to L. A. Perry et al.; 3,523,888 to N. C. Stewart et al. and 3,557,019 to R. P. Van Driesen teach an ebullated bed process wherein there is means for withdrawing catalyst from the bed and adding catalyst to the bed.

U.S. Pat. Nos. 3,412,010 to S. B. Alpert et al. and 3,363,992 to M. C. Chervenak teach an ebullated bed process. In the drawing is shown a catalyst bed interface and a catalyst level control. Also taught is an optional third, vapor phase filling the top of the reactor.

U.S. Pat. No. 3,398,085 to T. M. Engle teaches a process for catalyst addition and withdrawal in an ebullated bed process to maintain an average inventory of particulate solids in the reaction zone. Catalyst is introduced to a solids holding zone. The zone is purged of gases with oil and then sealed from the atmosphere. The sealed, oil filled catalyst zone is then pressured to reactor pressure and then transferred by liquid transport to the reaction zone by liquid phase transport. Solids are removed from the upper part of the reaction zone through a flow line at a rate corresponding to the rate transfer into the reaction zone by applying external gas under pressure to the flow line.

U.S. Pat. No. 4,750,989 to D. J. Soderberg discloses a method of determining catalyst inventory in an ebullated bed process.

EP 0 430 466 A1 discloses a process for making catalyst inventory measurements and adding or withdrawing catalyst in an ebullated bed process. The process relies on gamma-ray density measurements in three phase and two phase zones within the reactor.

BRIEF DESCRIPTION OF THE DRAWING

The drawing is a sectional elevated view of the reaction vessel with measurement points indicated.

DETAILED DESCRIPTION OF THE DRAWING

In order to demonstrate and provide a better understanding of the invention, reference is made to the drawing.

Reaction vessel 10 is positioned with its long axis in a vertical position and is generally of a circular cross section. Although this drawing is schematic in order to show its various features, it will be understood that the reactor is constructed in such a fashion and from such materials that it is suitable for reacting liquids, liquid-solid slurries, solids and gases at elevated temperatures and pressures and in a preferred embodiment for treating hydrocarbon liquids with hydrogen at high pressures and high temperatures, e.g. 100 to 5000 psi and 300° F. to 1500° F. The reactor 10 is fitted with a suitable inlet conduit 12 for feeding heavy oil and a hydrogen-containing gas. Outlet conduits are located in the upper portion of reactor 10; outlet conduit 14 designed to withdraw vapor and liquid, and optionally outlet conduit 24 to withdraw mainly liquid product. The reactor also contains means for introducing and withdrawing catalyst particles, which are shown schematically as conduit 15 through which fresh catalyst 16 is flowed and conduit 17 through which spent catalyst 7 is withdrawn.

Heavy oil feedstock is introduced through conduit 11, while hydrogen-containing gas is introduced through conduit 13, and may be combined with the feedstock and fed into reactor 10 through conduit 12 in the bottom of the reactor. The incoming fluid passes through grid tray 18 containing suitable fluid distribution means. In this drawing, bubble caps 19 are shown as the fluid distribution means, but it is to be understood that any suitable device known in the art which will uniformly distribute the fluid coming from conduit 12 over the entire cross-sectional area of reactor 10 may be utilized.

The mixture of liquid and gas flows upwardly, and the catalyst particles are thereby forced into an ebullated movement by the gas flow and the liquid flow delivered by recycle pump 20 (ebullation pump) which may be either internal or external to the reactor 10. The upward liquid flow delivered by this recycle pump 20 is sufficient to cause the mass of catalyst particles in catalytic reaction zone 22 (catalyst bed) to expand by at least 10% and usually up to 100% over the static volume, thus permitting gas and liquid flow as shown by direction arrow 21 through reactor 10. Due to the upwardly directed flow provided by the pump and the downward forces provided by gravity, the catalyst bed particles reach an upward level of travel or ebullation while the lighter liquid and gas continue to move upward beyond that level. In this drawing, the upper level of catalyst or catalyst-liquid interface is shown as interface 23, and the catalytic reaction zone 22 extends from grid tray 18 to level 23. Catalyst particles in catalytic reaction zone 22 move randomly and are uniformly distributed through the entire zone in reactor 10.

At steady state, few catalyst particles rise above catalyst-liquid interface 23. The catalyst depleted zone 29, above the interface 23, is filled with liquid and entrained gas or vapor. Gas and vapor are separated from liquid in the recycle cup 30 to collect and recycle a liquid with a substantially reduced gas and vapor content through recycle conduit 25 of generally circular cross-sectional area. A substantially liquid product may be withdrawn separately from gas and vapor through conduit 24, in which event conduit 14 terminates in a vapor space and is used to withdraw vapor alone. Alternatively gases, vapors, and liquids may be withdrawn together.

The enlarged upper end of recycle conduit 25 is the recycle cup 30. A plurality of vertically directed riser conduits 27 providing fluid communication between catalyst depleted zone 29 and outlet conduit 14. Gas-entrained fluid moves upwardly through the riser conduits 27, and upon leaving the upper ends of these riser conduits, a portion of the fluid reverses direction and flows downward through recycle conduit 25 to the inlet of recycle pump 20 and thereby is recycled to the lower portion of reactor 10 below grid tray 18. Gases and vapors which are separated from the liquid, rise to collect in the upper portion of reactor 10 and are removed through outlet conduit 14. The gases and vapors removed at this point are treated using conventional means to recover as much hydrogen as possible for recycle to conduit 13.

An interface height H2 is measured from a point $h_2$ corresponding to the interface 23 to a point $h_0$ adjacent the bottom of the bed, corresponding in this arrangement to the grid tray 18. Point $h_2$ is measured by conventional measuring means such as electronic gamma radiation detector or mechanical float level detector.

An effective bed height H1 is measured from a point $h_0$ adjacent the bottom of the bed to an intermediate fixed point $h_1$ within the bed 22. Intermediate fixed point $h_1$ is selected from the reactor design so that it is not above interface 23. First differential pressure $DP_1$ is measured between point $h_1$ and point $h_0$.

An effective reactor height H3 is measured from a point $h_3$ adjacent the fluid top of the reactor to a point adjacent the bottom of the bed $h_0$. The fluid top comprises the liquid top in a liquid filled reactor and the vapor top where both liquid and vapor phases are present.

Second differential pressure $DP_2$ is measured between point $h_3$ and point $h_1$.

SUMMARY OF THE INVENTION

This invention is an improvement in U.S. Pat. No. 4,902,407 to T. Y. Chan et al.

The invention is an improved method of maintaining a selected weight of catalyst in an ebullated bed process reactor during operation. In the ebullated bed process a fluid hydrocarbon feedstock is catalytically treated with a hydrogen-containing gas at elevated catalytic reaction temperatures and pressures. The feedstock and hydrogen-containing gas are introduced into the lower end of a generally vertical reaction vessel at sufficient velocity to place the catalyst in random motion within the hydrocarbon whereby the catalyst bed is expanded to a volume greater than the static volume, typically 10% to 100% greater. The mixture of feedstock, gas and catalyst constitutes a turbulent zone, the upper portion of which is defined by an interface with a substantially catalyst depleted zone.

An interface height (H2) is determined from a fixed point adjacent the bottom of the bed ($h_0$) to a variable point corresponding to the interface ($h_2$) The effective bed height ($H_1$) is determined from a point adjacent the bottom of the bed ($h_0$) to an intermediate fixed point ($h_1$) in the bed adjacent and below point ($h_2$) A first differential pressure ($DP_1$) is measured between point $h_0$ and point $h_1$. A reactor height (H3) is determined from a point adjacent the catalyst depleted zone top ($h_3$) to point ($h_0$). A second differential pressure $DP_2$ is measured between point ($h_3$) and point ($h_1$). A value for catalyst inventory characterization factor ($W_c$) is determined as a function of first differential pressure ($DP_1$), second differential pressure ($DP_2$) and interface height (H2). It is understood that the determination of $W_c$ as a function of the sum of $DP_1$ and $DP_2$ is equivalent. The catalyst inventory characterization is calculated using an improved determination of equilibrium catalyst single particle density rs and reactor total fluid density ($r_f$)

Catalyst is added or withdrawn to maintain the value of catalyst inventory characterization factor (Wc). The method provides more reproducible results and has particular utility in maintaining a constant product quality through transient operation, for example through feedstock switching.

DESCRIPTION OF THE PREFERRED EMBODIMENTS

In ebullated bed processes and similar fluidized bed reaction processes it is necessary from time to time or continuously to remove an amount of aged catalyst and replace it with fresh catalyst in order to maintain catalyst activity. In this procedure it is most desirable to add the same weight of fresh catalyst as is withdrawn, corrected for the increased density of aged catalyst.

It has also been found that a given feedstock is most effectively treated with the same amount of catalyst. Correlations of data show that the most effective amount of catalyst is different for different feedstocks but the amount for a given feedstock is quantitatively repeatable. It is therefore desirable to quantify a catalyst inventory characterization factor ($W_c$), the specific value for which is optimized for each feedstock by routine procedures and with occasional update of cost and price factors. This catalyst inventory characterization factor then is changed by addition or withdrawal of catalyst for each change in feedstock. The factor is checked daily or more frequently, e.g. once per shift at three shifts per day, by determining the factor and then making up catalyst lost with the liquid effluent.

Heretofore the catalyst inventory in the reactor has been estimated. The process is a dynamic system with quantities such as degree of fluidization, i.e. bed expansion; gas and liquid holdups, with gassy liquid density changing with pressure; and residence time changing continuously to such a degree that catalyst inventory cannot be determined with precision by any method assuming steady state.

A process has been discovered which avoids cumbersome methods of estimating catalyst inventory to achieve optimum yield of liquid fuels from each feedstock. The process relies on the determination of a catalyst inventory characterization factor ($W_c$) which is an empirical determination of catalyst inventory which takes into account the dynamic nature of the process.

The variables calculated by this method with units of measurement are as follows:

$W_c$ = catalyst inventory characterization factor (weight)
$r_f$ = reactor fluid (liquid + gas) density (weight/volume)
$r_s$ = density of a single particle of reactor equilibrium, non-porous oil soaked catalyst, with carbon and metals (weight/volume)

Measured variables are as follows:
$E_c$ = fresh catalyst settled bed void fraction (no units)
$r_c$ = fresh catalyst bulk settled density (weight/volume)
rde = dry equilibrium (used) catalyst settled bulk density (weight/volume)
pv = pore volume of dry equilibrium (used) catalyst (volume/weight)
A = reactor cross-sectional area (area)
$H_1$ = height of fixed point in catalyst bed immediately below (adjacent) lowest design operating level of $H_2$ (length)
$H_2$ = height of fluid supported catalyst bed (length)
$H_3$ = reactor height-fixed (length)
DPT = total reactor pressure drop ($DP_1 + DP_2$) (force/area)
$DP_1$ = pressure drop across ($h_0 - h_1$) (force/area)
$DP_2$ = pressure drop across ($h_0 - h_3$) (force/area)

From these parameters, three pressure equations and one equation for the density of a single particle of equilibrium (used) catalyst are derived.

$$DP_T = \frac{W_c (1 - E_c)(r_s - r_f)}{A\, r_c} + H_3 r_f \quad (1)$$

$$DP_2 = \frac{W_c (H_2 - H_1)(1 - E_c)(r_s - r_f)}{H_2 A\, r_c} + (H_3 - H_1) r_f \quad (2)$$

$$DP_1 = \frac{W_c H_1 (1 - E_c)(r_s - r_f)}{H_2 A\, r_c} + H_1 r_f \quad (3)$$

$$r_s = \frac{rde + pv\, rde\, r_f}{(1 - E_c)} \quad (4)$$

Equations 1, 2 and 3 are solved for $W_c$.
The three equations are:

$$W_c = \frac{H_2 DP_2}{K_1 (H_2 - H_1)} - \frac{r_f H_2 (H_3 - H_1)}{K_1 (H_2 - H_1)} \quad (5)$$

$$W_c = \frac{H_2 DP_1}{H_1 K_1} - \frac{r_f H_2}{K_1} \quad (6)$$

$$W_c = \frac{DP_1 + DP_2}{K_1} - \frac{r_f H_3}{K_1} \quad (7)$$

In each of the equations:

$$K_1 = \frac{(1 - E_c)(r_s - r_f)}{A\, r_c} \quad (8)$$

The variables rde, pv and $E_c$ are measured in the laboratory and substituted into equation (4) to yield the relationship between $r_s$ and $r_f$.

Equations (2) and (3) are combined to yield $$r_f = \frac{\frac{H_1 DP_2}{(H_2 - H_1)} - DP_1}{\frac{H_1 (H_3 - H_1)}{(H_2 - H_1)} - H_1} \quad (9)$$

The value of $r_f$ is calculated from equation (9) and substituted into equation (4) to calculate $r_s$, the liquid and gas soaked equilibrium (used) catalyst density.

Accordingly, the values of $r_s$, $r_f$ and $K_1$ are calculated and the inventory characterization factor ($W_c$) is calculated from equations (5), (6) or (7).

This invention is shown by way of Example.

EXAMPLE 1A

An ebullated bed reactor is operated on a vacuum residuum feedstock according to the invention. The following data are measured:

$A = 99\, ft.^2$ $H_3 = 71.2\, ft.$ $H_2 = 58\, ft.$ $H_1 = 48\, ft.$ $DP_1 = 2670\, lb/ft.^2$ $DP_2 = 930\, lb/ft.^2$ $E_c = 0.37$ $r_c = 37\, lb/ft.^3$

Then, an amount of aged catalyst and oil is withdrawn. A sample is analyzed to determine pv and rde.

$$pv = 0.0040046 \, ft^3/lb$$

$$rde = 60 \, lb/ft^3$$

The values of $r_s$, $r_f$ and $W_c$ are calculated.

$$W_c = 118,497 \, lb$$

$$r_s = 106.03693 \, lb/ft^3$$

$DP_1$ does not change. $DP_2$ is reduced. Fresh catalyst is added until the value of $W_c$ is reestablished. Optimum catalyst/oil ratio is thereby maintained.

The method of U.S. Pat. No. 4,902,407 uses an estimated value for $r_s$ of 120 lb/ft$^3$. This value yields a catalyst inventory characterization factor, $W_c = 100,451$ lb when used with the data above. This result differs from the value calculated according to the invention by 15.2%. The inventive method provides for more precise control of catalyst inventory.

A value of 28.31 lbs/ft$^3$ was obtained for $r_f$. The following equation is used to calculate the amount of gas in the reactor, referred to as gas holdup.

$$r_f = \frac{\text{vol \% gas (gas density)} + \text{vol \% liquid (liquid density)}}{100} = \frac{Vg(r_g) + Vl(r_f)}{100}$$

and $$Vg = \frac{100 r_f - 100 rl}{r_g - rl}$$

where $Vl = 100 - Vg$ vg = amount of gas in the reactor liquid-gas mixture, vol. %
Vl = amount of liquid in the reactor liquid-gas mixture, vol. %
$r_g$ = density of gas at reactor conditions, lbs/ft3
rl = density of liquid at reactor conditions, lbs/ft3
For the above example, $$r_g = 2.5 \, lbs/ft3$$

$$rl = 40 \, lbs/ft3$$

$$r_f = \frac{Vg (2.5) + (100 - Vg) (40)}{100} = 28.31$$

$$Vg = 31.2 \, vol \, \%$$

$$Vl = 68.8 \, vol \, \%$$

It is calculated that the reactor is operating at a gas holdup of 31.2 vol. %.

EXAMPLE 1B

The ebullated bed reactor is run at the conditions of Example 1A. A feed change is made which changes the gas holdup in the reactor from 31.2 vol. % to 40.26 vol. %. The value of $r_f$ decreases to 24.90 lbs/ft3, $DP_1 = 2541.7$ lbs/ft2 and $DP_2 = 858.2$ lb/ft2.

The catalyst inventory remains constant, however, gas holdup increases and liquid residence time decreases. A reactor temperature increase from 805° F. to 811° F. would be required to maintain 1000° F.+ conversion at 60 vol. %. This increased temperature requirement, DT, is calculated by the following equation:

$$DT = (\text{New gas holdup} - \text{old gas holdup}) (0.66) \quad (12)$$

$$= (Vg2 - Vg1) (0.66) \quad (13)$$

wherein:
Vg1 = old gas holdup, vol. %
Vg2 = new gas holdup, vol. %
DT = required reactor temperature increase, °F.

If enough heater capacity were available, the temperature could be raised to 811° F. to maintain 60 vol. % 1000° F.+ conversion. If the temperature were not raised, the conversion would drop to 55.4 vol. %, resulting in reduced production of higher valued distillate products.

For a given space velocity, the achievable 1000° F.+ conversion is a function of reactor temperature. For a small gas holdup, e.g. 8%, such as in a very short commercial reactor, 60 vol. % conversion of 1000° F.+ can be achieved at 792° F. As gas holdup increases, a higher temperature is required to maintain conversion.

EXAMPLE 1C

The run conditions are the same as Example 1B. It is desired to lower the gas holdup to 31.2 vol. % as in Example 1A so that the temperature can be lowered to 805° F. while the 1000° F.+ conversion maintained constant at 60 vol. %. The hydrogen gas rate is lowered to reduce the superficial gas velocity at the reactor inlet from 0.13 ft/sec. to 0.10 ft/sec. This reduction in velocity reduces the gas holdup from 40.26 vol. % to 31.2 vol. % while maintaining the 1000° F.+ conversion at 60 vol. % at 805° F. reactor temperature.

The new required gas velocity is calculated from the equation:

$$\text{New gas velocity} = \frac{(\text{old gas velocity}) (\text{old gas holdup})}{(\text{new gas holdup})}$$

$$SG2 = \frac{(SG1) (Vg1)}{(Vg2)}$$

where:
SG1 = old gas superficial velocity, ft/sec.
SG2 = new gas superficial velocity, ft/sec.
Vg1 = old gas holdup, vol. %
Vg2 = new gas holdup, vol. %

EXAMPLE 2A

The ebullated bed is operated according to the conditions of Example 1A. A new vacuum residuum feedstock is introduced and the gas holdup decreases from 31.2 vol. % to 22.2 vol. %. The values of $DP_1$ and $DP_2$ are recorded: $Dp_1 = 2796.8$ lb/ft2; $DP_2 = 1001.0$ lb/ft2.

According to the method, rs is calculated to be 107.3 lb/ft3 and $r_f$ is calculated to be 31.69 lb/ft3. It is calculated that a temperature decrease from 805° F. to 799° F. would be required to maintain 1000° F.+ conversion at 60 vol. %. However, the temperature is not lowered and the conversion rises to 64.6 vol. % for this relatively high sediment forming feedstock. The sediment concentration at the downstream fractionator bottoms increases from 0.04 wt. % (Example 1A) to 0.35 wt. % for this example, resulting in an increased fouling rate in the downstream recovery equipment.

EXAMPLE 2B

Example 2A is repeated. The decrease in gas holdup and conversion caused by the feedstock change is calculated. The 1000° F.+ conversion on the second feedstock is maintained at 60 vol. % by lowering reactor temperature. Sediment is maintained at 0.16 wt. %, below the preferred upper operating limit of 0.2 wt. %.

The Examples show that the method can be used to accurately measure the catalyst inventory and to maintain a selected catalyst/oil ratio. The method is useful to monitor gas holdup, and allows adjustments in the reactor temperature or inlet gas rate to maintain a selected conversion. This can be used to prevent excessive sediment formation and premature shutdown.

While particular embodiments of the invention have been described, it will be understood, of course, that the invention is not limited thereto since many modifications may be made, and it is, therefore, contemplated to cover by the appended claims any such modification as fall within the true spirit and scope of the invention.

What is claimed is:

1. A method of maintaining a selected weight of catalyst in a reactor in a continuous process for treating a fluid hydrocarbon feedstock with a hydrogen-containing gas at elevated catalytic reaction temperatures and pressures in the presence of a bed of particulate solid catalyst, said process comprising introducing the hydrogen-containing gas and feedstock into the lower end of a generally vertical catalyst containing reaction vessel at sufficient velocity whereby the catalyst is placed in random motion within the fluid hydrocarbon whereby the catalyst bed is expanded to a volume greater than its static volume, wherein the mixture of feedstock, gas and catalyst constitutes a turbulent zone from which zone aged catalyst is removed and fresh catalyst is added, the upper portion of which turbulent zone is defined by an interface with a substantially catalyst depleted zone from which zone hydrocracked hydrocarbon is removed, wherein the improvement comprises:
   1. determining an interface height (H2) from a point adjacent the bottom of the bed ($h_0$) to a point corresponding to the interface ($h_2$),
   2. determining an effective bed height (H1) from the point adjacent the bottom of the bed ($h_0$) to an intermediate fixed point ($h_1$) in the bed adjacent the interface, and
   3. determining a reactor height (H3) from a point adjacent the catalyst depleted zone top ($h_3$) to the point adjacent the bottom of the bed ($h_0$),
   4. measuring a first differential pressure ($DP_1$) between the point adjacent the bottom of the bed ($h_0$) and the intermediate fixed point ($h_1$),
   5. measuring a second differential pressure ($DP_2$) between the point adjacent the catalyst depleted zone top ($h_3$) and the intermediate fixed point ($h_1$),
   6. determining a value for a catalyst inventory characterization factor ($W_c$) in accordance with the formula:

$$W_c = \frac{H_2 DP_2}{K_1(H_2 - H_1)} - \frac{r_f H_2(H_3 - H_1)}{K_1(H_2 - H_1)}$$

wherein:

$$K_1 = \frac{(1 - E_c)}{A} \cdot \frac{(r_s - r_f)}{r_c}$$

$D_c$ = fresh catalyst void fraction
   $r_c$ = fresh catalyst bulk settled density
   A = reactor cross-sectional area,
   $r_f$ is reactor fluid density according to the formula;

$$r_f = \frac{\frac{H_1 DP_2}{(H_2 - H_1)} - DP_1}{\frac{H_1(H_3 - H_1)}{(H_2 - H_1)} - H_1}$$

$r_s$ is the density of a single particle of equilibrium catalyst according to the formula:

$$r_s = \frac{rde(1 + pv \cdot r_f)}{1 - Ec}$$

rde = dry equilibrium catalyst bulk settled density
   pv = pore volume of equilibrium catalyst
   6. removing aged catalyst, thereby changing the value of said catalyst inventory characterization factor ($W_c$), and
   7. adding fresh catalyst in an amount to return to said value of catalyst inventory characterization factor ($W_c$).

2. An improved method of maintaining a selected weight of catalyst in a reactor in a continuous process for treating a fluid hydrocarbon feedstock with a hydrogen-containing gas at elevated catalytic reaction temperatures and pressures in the presence of a bed of particulate solid catalyst, said process comprising introducing the hydrogen-containing gas and feedstock into the lower end of a generally vertical catalyst containing reaction vessel at sufficient velocity whereby the catalyst is placed in random motion within the fluid hydrocarbon whereby the catalyst bed is expanded to a volume greater than its static volume, wherein the mixture of feedstock, gas and catalyst constitutes a turbulent zone from which zone aged catalyst is removed and fresh catalyst is added, the upper portion of which turbulent zone is defined by an interface with a substantially catalyst depleted zone from which zone hydrocracked hydrocarbon is removed, wherein the improvement comprises:
   1. determining an interface height (H2) from a point adjacent the bottom of the bed ($h_0$) to a point corresponding to the interface ($h_2$),
   2. determining an effective bed height (H1) from a point adjacent the bottom of the bed ($h_0$) to an intermediate fixed point ($h_1$) in the bed adjacent the interface, and
   3. determining a reactor height (H3) from a point adjacent the catalyst depleted zone top ($h_3$) to the point adjacent the bottom of the bed ($h_0$),
   4. measuring a first differential pressure ($DP_1$) between the point adjacent the bottom of the bed ($h_0$) and the intermediate fixed point ($h_1$),
   5. measuring a second differential pressure ($DP_2$) between the point adjacent the catalyst depleted zone top ($h_3$) and the intermediate fixed point ($h_1$),
   6. determining a value for a catalyst inventory characterization factor ($W_c$) in accordance with the formula:

$$W_c = \frac{H_2 DP_1}{H_1 K_1} - \frac{r_f H_2}{K_1}$$

-continued wherein:

$$K_1 = \frac{(1 - E_c)}{A} \frac{(r_s - r_f)}{r_c}$$

$E_c$ = fresh catalyst void fraction
$r_c$ = fresh catalyst bulk settled density
A = reactor cross-sectional area,
$r_f$ is reactor fluid density according to the formula:

$$r_f = \frac{\frac{H_1 DP_2}{(H_2 - H_1)} - DP_1}{\frac{H_1(H_3 - H_1)}{(H_2 - H_1)} - H_1}$$

$r_s$ is th edensity of a single particle of equilibrium catalyst according to the formula:

$$r_s = \frac{rde(1 + pv\, r_f)}{1 - Ec}$$

rde = dry equilibrium catalyst bulk settled density
pv = pore volume of equilibrium catalyst 7. removing aged catalyst, thereby changing the value of said catalyst inventory characterization factor ($W_c$), and
8. adding fresh catalyst in an amount to return to said value of catalyst inventory characterization factor ($W_c$)

3. An improved method of maintaining a selected weight of catalyst in a reactor in a continuous process for treating a fluid hydrocarbon feedstock with a hydrogen-containing gas at elevated catalytic reaction temperatures and pressures in the presence of a bed of particulate solid catalyst, said process comprising introducing the hydrogen-containing gas and feedstock into the lower end of a generally vertical catalyst containing reaction vessel at sufficient velocity whereby the catalyst is placed in random motion within the fluid hydrocarbon whereby the catalyst bed is expanded to a volume greater than its static volume, wherein the mixture of feedstock, gas and catalyst constitutes a turbulent zone from which zone aged catalyst is removed and fresh catalyst is added, the upper portion of which turbulent zone is defined by an interface with a substantially catalyst depleted zone from which zone hydrocarbon is removed, wherein the improvement comprises:

1. determining an interface height (H2) from a point adjacent the bottom of the bed ($h_0$) to a point corresponding to the interface ($h_2$),
2. determining an effective bed height (H1) from the point adjacent the bottom of the bed ($h_0$) to an intermediate fixed point ($h_1$) in the bed adjacent the interface, and
3. determining a reactor height (H3) from a point adjacent the catalyst depleted zone top ($h_3$) to the point adjacent the bottom of the bed ($h_0$),
4. measuring a first differential pressure (DP$_1$) between the point adjacent the bottom of the bed ($h_0$) and the intermediate fixed point ($h_1$),
5. measuring a second differential pressure (DP$_2$) between the point adjacent the catalyst depleted zone top ($h_3$) and the intermediate fixed point ($h_1$),
6. determining a value for a catalyst inventory characterization factor ($W_c$) in accordance with the formula:

$$W_c = \frac{DP_1 + DP_2}{K_1} - \frac{r_f H_3}{K_1}$$

wherein:

$$K_1 = \frac{(1 - E_c)}{A} \frac{(r_s - r_f)}{r_c}$$

$E_c$ = fresh catalyst void fraction
$r_c$ = fresh catalyst bulk settled density
A = reactor cross-sectional area,
$r_f$ is reactor fluid density according to the formula:

$$r_f = \frac{\frac{H_1 DP_2}{(H_2 - H_1)} - DP_1}{\frac{H_1(H_3 - H_1)}{(H_2 - H_1)} - H_1}$$

$r_s$ is the density of a single particle of equilibrium catalyst according to the formula:

$$r_s = \frac{rde(1 + pv\, r_f)}{1 - Ec}$$

rde = dry equilibrium catalyst bulk settled density
pv = pore volume of equilibrium catalyst 6. removing aged catalyst, thereby changing the value of said catalyst inventory characterization factor ($W_c$), and
7. adding fresh catalyst in an amount to return to said value of catalyst inventory characterization factor ($W_c$).

4. An improved method of maintaining a selected weight of catalyst in a reactor in a continuous process for treating a fluid hydrocarbon feedstock with a hydrogen-containing gas at elevated catalytic reaction temperatures and pressures in the presence of a bed of particulate solid catalyst, said process comprising introducing the hydrogen-containing gas and feedstock into the lower end of a generally vertical catalyst containing reaction vessel at sufficient velocity whereby the catalyst is placed in random motion within the fluid hydrocarbon whereby the catalyst bed is expanded to a volume greater than its static volume, wherein the mixture of feedstock, gas and catalyst constitutes a turbulent zone, the upper portion of which is defined by an interface with a substantially catalyst depleted zone, wherein the improvement comprises:

1. determining an interface height (H2) from a point adjacent the bottom of the bed ($h_0$) to a point corresponding to the interface ($h_2$),
2. determining an effective bed height (H1) from the point adjacent the bottom of the bed ($h_0$) to an intermediate fixed point ($h_1$) in the bed adjacent the interface, and
3. determining a reactor height (H3) from a point adjacent the catalyst depleted zone top ($h_3$) to the point adjacent the bottom of the bed ($h_0$),
4. measuring a first differential pressure (DP$_1$) between the point adjacent the bottom of the bed ($h_0$) and the intermediate fixed point ($h_1$), 5. measuring a second differential pressure ($DP_2$) between the point adjacent the catalyst depleted zone top ($h_3$) and the intermediate fixed point
6. determining a value for a catalyst inventory characterization factor ($W_c$) in accordance with the formula:

$$W_c = \frac{H_2 DP_2}{K_1(H_2 - H_1)} - \frac{r_f H_2(H_3 - H_1)}{K_1(H_2 - H_1)}$$

wherein:

$$K_1 = \frac{(1 - E_c)}{A} \frac{(r_s - r_f)}{r_c}$$

$E_c$ = fresh catalyst void fraction
$r_c$ = fresh catalyst bulk settled density
$A$ = reactor cross-sectional area,
$r_f$ is reactor fluid density according to the formula:

$$r_f = \frac{\frac{H_1 DP_2}{(H_2 - H_1)} - DP_1}{\frac{H_1(H_3 - H_1)}{(H_2 - H_1)} - H_1}$$

$r_s$ is the density of a single particle of equilibrium catalyst according to the formula:

$$r_s = \frac{rde(1 + pv\, r_f)}{1 - Ec}$$

rde = dry equilibrium catalyst bulk settled density
pv = pore volume of equilibrium catalyst 6. adding or withdrawing catalyst in an amount to maintain said value of catalyst inventory characterization factor ($W_c$).

5. An improved method of maintaining a selected weight of catalyst in a reactor in a continuous process for treating a fluid hydrocarbon feedstock with a hydrogen-containing gas at elevated catalytic reaction temperatures and pressures in the presence of a bed of particulate solid catalyst, said process comprising introducing the hydrogen-containing gas and feedstock into the lower end of a generally vertical catalyst containing reaction vessel at sufficient velocity whereby the catalyst is placed in random motion within the fluid hydrocarbon whereby the catalyst bed is expanded to a volume greater than its static volume, wherein the mixture of feedstock, gas and catalyst constitutes a turbulent zone, the upper portion of which is defined by an interface with a substantially catalyst depleted zone, wherein the improvement comprises:
 1. determining an interface height ($H_2$) from a point adjacent the bottom of the bed ($h_0$) to a point corresponding to the interface ($h_2$),
 2. determining an effective bed height ($H_1$) from the point adjacent the bottom of the bed ($h_0$) to an intermediate fixed point ($h_1$) in the bed adjacent the interface, and
 3. determining a reactor height ($H_3$) from a point adjacent the catalyst depleted zone top ($h_3$) to the point adjacent the bottom of the bed ($h_0$),
 4. measuring a first differential pressure ($DP_1$) between the point adjacent the bottom of the bed ($h_0$) and the intermediate fixed point ($h_1$),
 5. measuring a second differential pressure ($DP_2$) between the point adjacent the catalyst depleted zone top ($h_3$) and the intermediate fixed point ($h_1$)
 6. determining a value for a catalyst inventory characterization factor ($W_c$) in accordance with the formula:

$$W_c = \frac{H_2 DP_2}{H_1 K_1} - \frac{r_f H_2}{K_1}$$

wherein:

$$K_1 = \frac{(1 - E_c)}{A} \frac{(r_s - r_f)}{r_c}$$

$E_c$ = fresh catalyst void fraction
$r_c$ = fresh catalyst bulk settled density
$A$ = reactor cross-sectional area,
$r_f$ is reactor fluid density according to the formula:

$$r_f = \frac{\frac{H_1 DP_2}{(H_2 - H_1)} - DP_1}{\frac{H_1(H_3 - H_1)}{(H_2 - H_1)} - H_1}$$

$r_s$ is the density of a single particle of equilibrium catalyst according to the formula:

$$r_s = \frac{rde(1 + pv\, r_f)}{1 - Ec}$$

rde = dry equilibrium catalyst bulk settled density
pv = pore volume of equilibrium catalyst 6. adding or withdrawing catalyst in an amount to maintain said value of catalyst inventory characterization factor ($W_c$).

6. An improved method of maintaining a selected weight of catalyst in a reactor in a continuous process for treating a fluid hydrocarbon feedstock with a hydrogen-containing gas at elevated catalytic reaction temperatures and pressures in the presence of a bed of particulate solid catalyst, said process comprising introducing the hydrogen-containing gas and feedstock into the lower end of a generally vertical catalyst containing reaction vessel at sufficient velocity whereby the catalyst is placed in random motion within the fluid hydrocarbon whereby the catalyst bed is expanded to a volume greater than its static volume, wherein the mixture of feedstock, gas and catalyst constitutes a turbulent zone from which zone aged catalyst is removed and fresh catalyst is added, the upper portion of which turbulent zone is defined by an interface with a substantially catalyst depleted zone from which zone hydrocarbon is removed, wherein the improvement comprises:
 1. determining an interface height ($H_2$) from a point adjacent the bottom of the bed ($h_0$) to a point corresponding to the interface ($h_2$),
 2. determining an effective bed height ($H_1$) from the point adjacent the bottom of the bed ($h_0$) to an intermediate fixed point ($h_1$) in the bed adjacent the interface, and
 3. determining a reactor height ($H_3$) from a point adjacent the catalyst depleted zone top ($h_3$) to the point adjacent the bottom of the bed ($h_0$),
 4. measuring a first differential pressure ($DP_1$) between the point adjacent the bottom of the bed ($h_0$) and the intermediate fixed point ($h_1$), 5. measuring a second differential pressure (DP$_2$) between the point adjacent the catalyst depleted zone top (h$_3$) and the intermediate fixed point (h$_1$),
6. determining a value for a catalyst inventory characterization factor (W$_c$) in accordance with the formula:

$$W_c = \frac{DP_1 + DP_2}{K_1} - \frac{r_f H_3}{K_1}$$

wherein:

$$K_1 = \frac{(1 - E_c)}{A} \frac{(r_s - r_f)}{r_c}$$

E$_c$=fresh catalyst void fraction
r$_c$=fresh catalyst bulk settled density
A=reactor cross-sectional area,
r$_f$ is reactor fluid density according to the formula:

$$r_f = \frac{\frac{H_1 DP_2}{(H_2 - H_1)} - DP_1}{\frac{H_1(H_3 - H_1)}{(H_2 - H_1)} - H_1}$$

r$_s$ is the density of a single particle of equilibrium catalyst according to the formula:

$$r_s = \frac{rde(1 + pv \, r_f)}{1 - Ec}$$

rde=dry equilibrium catalyst bulk settled density
pv=pore volume of equilibrium catalyst
6. adding or withdrawing catalyst in an amount to maintain said value of catalyst inventory characterization factor (W$_c$).
7. A method of maintaining a selected gas holdup in a gas-liquid mixture in a reactor in a continuous process for treating a fluid hydrocarbon feedstock with a hydrogen-containing gas at elevated catalytic reaction temperatures and pressures in the presence of a bed of particulate solid catalyst, said process comprising introducing the hydrogen-containing gas at a linear velocity SG and feedstock into the lower end of a generally vertical catalyst containing reaction vessel at sufficient velocity whereby the catalyst is placed in random motion within the fluid hydrocarbon whereby the catalyst bed is expanded to a volume greater than its static volume, wherein the mixture of feedstock, gas and catalyst constitutes a turbulent zone from which zone aged catalyst is removed and fresh catalyst is added, the upper portion of which turbulent zone is defined by an interface with a substantially catalyst depleted zone from which zone hydrocracked hydrocarbon is removed, wherein the improvement comprises:
1. determining an interface height (H2) from a point adjacent the bottom of the bed (h$_0$) to a point corresponding to the interface (h$_2$),
2. determining an effective bed height (H$_1$) from the point adjacent the bottom of the bed (h$_0$) to an intermediate fixed point (h$_1$) in the bed adjacent the interface, and
3. determining a reactor height (H3) from a point adjacent the catalyst depleted zone top (h$_3$) to the point adjacent the bottom of the bed (h$_0$),
4. measuring a first differential pressure (DP$_1$) between the point adjacent the bottom of the bed (h$_0$) and the intermediate fixed point (h$_1$),
5. measuring a second differential pressure (DP$_2$) between the point adjacent the catalyst depleted zone top (h$_3$) and the intermediate fixed point (h$_1$),
6. determining a value for the density (rf) of said fluid content in accordance with the formula:

$$r_f = \frac{\frac{H_1 DP_2}{(H_2 - H_1)} - DP_1}{\frac{H_1(H_3 - H_1)}{(H_2 - H_1)} - H_1}$$

7. measuring a first hydrogen-containing gas inlet velocity SG1,
8. calculating a gas holdup (Vg) according to the formula:

$$Vg = \frac{100 r_f - 100 rl}{rg - rl}$$

wherein:
rl=density of liquid in the reactor
rg=density of gas in the reactor
9. Changing the composition of the liquid charge entering the reactor, thereby changing the value of said density of gas and liquid mixture in the reactor, r$_f$, and the amount of gas holdup, Vg, and
10. Changing the linear velocity of the gas entering the bottom of the reactor in an amount to return the said value of gas holdup by the formula:

$$SG2 = \frac{SG1(Vg1)}{(Vg2)}$$

where:
SG2=new gas linear velocity
Vg1=original gas holdup
Vg2=new gas holdup.
8. A method of maintaining a selected conversion of feedstock in a reactor in a continuous process for treating a fluid hydrocarbon feedstock with a hydrogen-containing gas at elevated catalytic reaction temperatures and pressures in the presence of a bed of particulate solid catalyst, said process comprising introducing the hydrogen-containing gas and feedstock into the lower end of a generally vertical catalyst containing reaction vessel at sufficient velocity whereby the catalyst is placed in random motion within the fluid hydrocarbon whereby the catalyst bed is expanded to a volume greater than its static volume, wherein the mixture of feedstock, gas and catalyst constitutes a turbulent zone from which zone aged catalyst is removed and fresh catalyst is added, the upper portion of which turbulent zone is defined by an interface with a substantially catalyst depleted zone from which zone hydrocracked hydrocarbon is removed, wherein the improvement comprises:
1. determining an interface height (H2) from a point adjacent the bottom of the bed (h$_0$) to a point corresponding to the interface (h$_2$),
2. determining an effective bed height (H$_1$) from the point adjacent the bottom of the bed (h$_0$) to an intermediate fixed point (h$_1$) in the bed adjacent the interface, and 3. determining a reactor height (H3) from a point adjacent the catalyst depleted zone top (h3) to the point adjacent the bottom of the bed (h0),
4. measuring a first differential pressure (DP1) between the point adjacent the bottom of the bed (h0) and the intermediate fixed point (h1),
5. measuring a second differential pressure (DP2) between the point adjacent the catalyst depleted zone top (h3) and the intermediate fixed point (h1),
6. determining a value for a catalyst inventory characterization factor ($W_c$) in accordance with the formula:

$$W_c = \frac{H_2 DP_2}{K_1(H_2 - H_1)} - \frac{r_f H_2 (H_3 - H_1)}{K_1(H_2 - H_1)}$$

wherein:

$$K_1 = \frac{(1 - E_c)}{A} \frac{(r_s - r_f)}{r_c}$$

$E_c$ = fresh catalyst void fraction
$r_c$ = fresh catalyst bulk settled density
A = reactor cross-sectional area,
$r_f$ is reactor fluid density according to the formula:

$$r_f = \frac{\frac{H_1 DP_2}{(H_2 - H_1)} - DP_1}{\frac{H_1(H_3 - H_1)}{(H_2 - H_1)} - H_1}$$

7. Measuring a first hydrogen-containing gas inlet velocity SG1, 8. calculating a gas holdup (Vg) according to the formula:

$$Vg = \frac{100 r_f - 100 rl}{rg - rl}$$

wherein:
rl = density of liquid in the reactor,
rg = density of gas in the reactor.

9. Changing the temperature in the reactor in an amount to return the conversion to original value by the formula:

$$T2 = T1 + (Vg2 - Vg1)(0.66)$$

where:
T2 = new reactor temperature
T1 = original reactor temperature
Vg1 = original gas holdup
Vg2 = new gas holdup.

10. Changing the composition of the liquid charge entering the reactor, thereby changing the value of said density of gas and liquid mixture in the reactor, $r_f$, and the amount of gas holdup, Vg, and 11. Changing the linear velocity of the gas entering the bottom of the reactor in an amount to return the said value of gas holdup by the formula:

$$SG2 = \frac{SG1(Vg1)}{(Vg2)}$$

where:
SG2 = new gas linear velocity
Vg1 = original gas holdup
Vg2 = new gas holdup.

* * * * *

UNITED STATES PATENT AND TRADEMARK OFFICE
CERTIFICATE OF CORRECTION

PATENT NO. : 5,215,653
DATED : June 1, 1993
INVENTOR(S) : Gerald Verdell Nelson and Govanon (NMN) Nongbri It is certified that error appears in the above-identified patent and that said Letters Patent is hereby corrected as shown below:

Claim 2, Col. 10, line 1, please substitute --$E_c$-- for "$D_c$".

Claim 2, Col. 11, line 19, please substitute --the density-- for "th edensity".

Claim 1, Col. 11, line 31, after "($W_c$)", insert --.--.

Claim 4, Col. 13, line 3, after "point", insert --($h_1$),--.

Claim 5, Col. 14, line 3, after ($h_1$), insert --,--.

Claim 5, Col. 14, line 8, please substitute --$H_2DP_1$-- for "$H_2DP_2$".

Signed and Sealed this

Fifteenth Day of February, 1994

Attest:

BRUCE LEHMAN

Attesting Officer   Commissioner of Patents and Trademarks